UNITED STATES PATENT OFFICE.

WALTER T. GODDARD, OF HAMILTON, ONTARIO, CANADA, ASSIGNOR, BY MESNE ASSIGNMENTS, TO LOCKE INSULATOR CORPORATION, OF BALTIMORE, MARYLAND, A CORPORATION OF MARYLAND.

CEMENT.

1,409,091.        Specification of Letters Patent.      Patented Mar. 7, 1922.

No Drawing.     Application filed June 17, 1919. Serial No. 304,831.

*To all whom it may concern:*

Be it known that I, WALTER T. GODDARD, a citizen of the United States, residing at Hamilton, in the Province of Ontario and Dominion of Canada, have invented certain new and useful Improvements in Cements; and I do hereby declare the following to be a full, clear, and exact description of the invention, such as will enable others skilled in the art to which it appertains to make and use the same.

My invention relates to a composition of matter which is especially useful in connection with the high voltage type of insulator and has for its object the production of a cementitious compound which is highly tenacious, durable and to a limited extent elastic.

One of the principal objects of the invention is to produce a cement, suitable for use as the binding element between an insulator unit of porcelain or glass and another similar unit or the metallic element which forms the connection between the insulator and another insulator or the support by which the insulator is sustained. This object is accomplished by incorporating in the cement a granular ingredient which is treated with an elastic substance so that when said ingredient is incorporated in the cement, the latter will have the desired degree of elasticity.

Before describing my invention in detail, it is believed that it will lead to a better understanding to describe the general practice now followed in connecting porcelain insulator units to each other or to the hardware, such as metallic caps, eyebolts, etc. The insulator is generally provided with substantially cylindrical neck or stem over which is placed either another insulator unit or a metallic bell-shaped cap. Between the two members thus joined is poured a very liquid cement generally composed of a mixture of Portland cement and sand. The cement mixture makes a rigid bond between the insulator units and prevents the separation thereof. It is well known, however, that on the exposure of the insulator unit so connected to atmospheric conditions the cement gradually increases in bulk or volume and this increase causes tremendous pressure on the insulator units, in fact the pressure often exceeds the elastic limit of the porcelain causing a rupture of the insulator body which immediately results in short circuit and damage to the transmission line.

By combining with a cement mixture an elastic ingredient, as contemplated by my invention, a cement mixture is produced which avoids the disastrous results described above, since the compressibility of elastic ingredient of the cement mixture is amply sufficient to compensate for the increase in bulk or volume of the cement without causing excessive pressure upon the insulator parts.

In making the cement mixture, according to my invention, it is preferred to combine with Portland cement or a like substance, as the same is commercially manufactured, a certain proportion of sand or other suitable filler or aggregate and to add to these ingredients a certain percentage of filler or aggregate which has been previously or initially treated with an elastic solution, to thereby coat said percentage of filler or aggregate with a surrounding envelope which is highly elastic.

It has been found that the following percentages used in a cement mixture produce a cement possessing the desired amount of elasticity for use in connection with insulators:

| | |
|---|---|
| Cement | 33% to 250% |
| Filler | 40% to 60% |
| Coated filler | 7% to 10% |

It is to be understood, however, that the percentage of coated filler may be slightly decreased as to 5% or materially increased as to 15 or 20% without departing from the scope of my invention.

The coated filler may comprise sand, granulated quartz, granulated slag, or granulated porcelain or like material and this material may be coated by immersion in an elastic solution, which may be formed by dissolving rubber in carbon di-sulphide or other suitable solvent.

The foregoing mixture makes a smooth and uniform cement which may be readily poured and which possesses sufficient elasticity to overcome the injurious results of cement mixtures now commonly used in connecting insulator units.

Having now described my invention, what I claim and desire to secure by Letters Patent is:—

1. A cement composition containing an inert non-friable element initially coated with an elastic substance.

2. A cement composition containing a non-friable filler initially coated with an elastic substance.

3. A cement composition containing a non-friable filler initially coated with rubber.

4. An elastic cement composition comprising cement and a filler or aggregate, a portion of said filler or aggregate being initially coated with an elastic substance.

In testimony whereof I affix my signature.

WALTER T. GODDARD.